United States Patent
Cooper, Jr. et al.

(10) Patent No.: US 9,210,272 B2
(45) Date of Patent: Dec. 8, 2015

(54) SYSTEM AND METHOD FOR CONFIGURATION ACCESS VIA CONNECTED DEVICES

(75) Inventors: Steven Lee Cooper, Jr., Whitestown, IN (US); Matthew John Wahoske, Fishers, IN (US)

(73) Assignee: Thomson Licensing, Issy les Moulineaux (FR)

( * ) Notice: Subject to any disclaimer, the term of this patent is extended or adjusted under 35 U.S.C. 154(b) by 323 days.

(21) Appl. No.: 13/876,031

(22) PCT Filed: Oct. 15, 2010

(86) PCT No.: PCT/US2010/002761
§ 371 (c)(1),
(2), (4) Date: Mar. 26, 2013

(87) PCT Pub. No.: WO2012/050546
PCT Pub. Date: Apr. 19, 2012

(65) Prior Publication Data
US 2013/0177054 A1    Jul. 11, 2013

(51) Int. Cl.
| | | |
|---|---|---|
| H04B 1/38 | (2015.01) | |
| H04M 11/06 | (2006.01) | |
| H04L 12/28 | (2006.01) | |
| H04L 12/24 | (2006.01) | |
| H04M 1/725 | (2006.01) | |
| H04N 21/41 | (2011.01) | |
| H04N 21/422 | (2011.01) | |
| H04N 21/426 | (2011.01) | |

(Continued)

(52) U.S. Cl.
CPC ........... *H04M 11/06* (2013.01); *H04L 12/2801* (2013.01); *H04L 41/0816* (2013.01); *H04L 41/5061* (2013.01); *H04L 63/105* (2013.01); *H04M 1/72527* (2013.01); *H04N 21/4126* (2013.01); *H04N 21/42201* (2013.01); *H04N 21/42676* (2013.01); *H04N 21/6118* (2013.01); *H04L 63/0861* (2013.01)

(58) Field of Classification Search
CPC ............ H04M 11/06; H04M 1/72527; H04N 21/4126; H04N 21/42201; H04N 21/6118; H04N 21/42676; H04L 41/0816; H04L 12/2801; H04L 41/5061; H04L 63/105; H04L 63/0861
USPC ........................................................ 375/222
See application file for complete search history.

(56) References Cited

U.S. PATENT DOCUMENTS

| | | | |
|---|---|---|---|
| 6,615,257 B2 * | 9/2003 | Lee et al. | ...................... 709/222 |
| 6,618,387 B1 | 9/2003 | Liu et al. | |

(Continued)

FOREIGN PATENT DOCUMENTS

| | | |
|---|---|---|
| EP | 1551153 | 7/2005 |
| WO | WO02058375 | 7/2002 |

OTHER PUBLICATIONS

Search Rept:Jul. 1, 2011.

*Primary Examiner* — Juan A Torres
(74) *Attorney, Agent, or Firm* — Robert D. Shedd (57) ABSTRACT

Systems and methods are shown for configuring a cable modem using a dedicated user device that include providing a dedicated port on a cable modem for connecting to a user service device, initiating a configuration connection between the user service device and a cable modem that bypasses the cable modem's authentication process, and changing settings on the cable modem in accordance with input from the user service device.

19 Claims, 5 Drawing Sheets

(51) Int. Cl.
*H04N 21/61* (2011.01)
*H04L 29/06* (2006.01)

(56) References Cited

U.S. PATENT DOCUMENTS

| | | | |
|---|---|---|---|
| 6,775,713 | B1 | 8/2004 | Liu et al. |
| 6,879,582 | B1* | 4/2005 | Dhara et al. ............... 370/352 |
| 7,068,597 | B1 | 6/2006 | Fijolek et al. |
| 7,107,326 | B1 | 9/2006 | Fijolek et al. |
| 7,697,429 | B2 | 4/2010 | Godlewski |
| 2003/0009306 | A1* | 1/2003 | Fang .............................. 702/122 |
| 2005/0060434 | A1* | 3/2005 | Fazal et al. ..................... 709/247 |
| 2006/0253562 | A1* | 11/2006 | Ho et al. ......................... 709/223 |
| 2007/0157237 | A1* | 7/2007 | Cordray et al. .................. 725/42 |
| 2009/0097661 | A1* | 4/2009 | Orsini et al. ................... 380/279 |
| 2010/0052853 | A1* | 3/2010 | Hilton ........................... 340/5.83 |
| 2012/0066321 | A1* | 3/2012 | Perry, II ........................ 709/206 |

* cited by examiner

SYSTEM AND METHOD FOR CONFIGURATION ACCESS VIA CONNECTED DEVICES

This application claims the benefit, under 35 U.S.C. §365 of International Application PCT/US2010/002761, filed Oct. 15, 2010, which was published in accordance with PCT Article 21(2) on Apr. 19, 2012 in English.

BACKGROUND

Modern cable modems provide internet access and voice services to customers over the cable television network. Cable modems permit the connection of consumer premises equipment (CPE) such as personal computers and voice over internet protocol (VOIP) handsets. This permits service providers to offer a wide variety of services through a single piece of hardware. Such cable modems offer a wide range of configuration options, particularly with respect to the configuration of a user's home computer network. Unfortunately, the user interfaces for such devices are unintuitive at best and pose a significant challenge for the average user. This problem is made worse by the arcane manner in which users must connect to the cable modem, frequently requiring the use of a wired Ethernet connection and a computer.

In most cases, a user must establish a physical connection to the cable modem and enter a default IP address that identifies the device. The average user has no idea what an IP address is, nor how to use one. Additionally, misconfiguration of the cable modem can render it practically impossible to use the standard method of configuration without manually resetting the modem and its settings.

SUMMARY

A communication device is shown that includes a configuration module configured to control operation of at least one network port and having an authentication function. The communication device further includes an interface module operatively connected to a dedicated service port configured to provide services to a user service device, and further connected to the configuration module, said interface module being configured to modify operation of the configuration module in response to user input, and being further configured to provide user interface information to the dedicated service port. The interface module bypasses the configuration module's authentication procedure for user inputs that come from the dedicated service port.

A communication system is shown, comprising a communication device, configured to be reconfigurable by a user, having a dedicated service port and an authentication function. The communication system further comprises a dedicated user service device connected to the dedicated service port, configured to bypass the authentication function and change settings for the communication device.

A method for configuring a cable modem is shown that includes providing a dedicated port on a cable modem for connecting to a user service device, initiating a configuration connection between the user service device and a cable modem that bypasses the cable modem's authentication process, and changing settings on the cable modem in accordance with input from the user service device.

BRIEF DESCRIPTION OF THE DRAWINGS

The embodiments provided herein can be readily understood by considering the following detailed description in conjunction with the accompanying drawings, in which.

It should be understood that the drawings are for purposes of illustrating the concepts and are not necessarily the only possible configuration for illustrating the invention. To facilitate understanding, identical reference numerals have been used, where possible, to designate identical elements that are common to the figures.

DETAILED DESCRIPTION

The present principles provide systems and methods for configuring a cable modem using a connected device without the need to follow complicated instructions to establish a connection. In particular, many users subscribe to voice over interne protocol (VOIP) services which employ telephone handsets. These handsets are dedicated devices that can connect to the cable modem independently from the user's computer network. By employing a device that automatically connects to the cable modem, a user can gain access to the cable modem's configuration settings without needing a complicated connection and log-in procedure. This greatly simplifies the procedure of changing configuration settings on the cable modem and furthermore presents an alternative method for configuration in the event of a forgotten password or accidental misconfiguration that prevents the user from accessing the cable modem through other means.

The functions of the various elements shown in the figures described below can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

Figure 1:
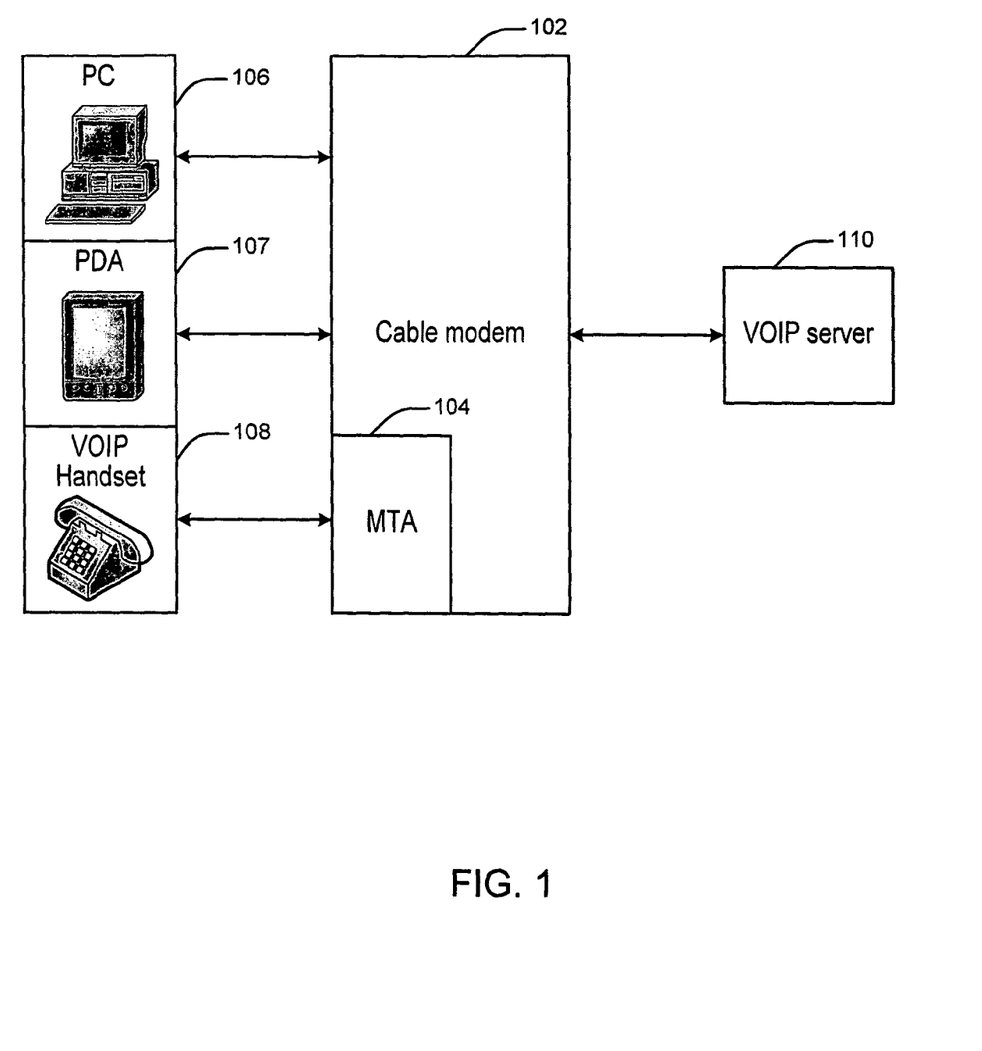
FIG. 1 is a block diagram illustrating an exemplary home network using a cable modem.

Referring now in specific detail to the drawings in which like reference numerals identify similar or identical elements throughout the several views, and initially to FIG. 1, an exemplary home network connecting to the outside through a cable modem is shown. Although a cable network is used for the purpose of illustration, the present principles are equally applicable to DSL, dial-up, WiMAX, and other networks. The network includes a cable modem 102 having an integrated multimedia terminal adapter (MTA) 104. One or more PCs 106 are connected to the cable modem 102 via a networking method such as wired Ethernet, wireless local area networks, etc. Additionally, a laptop, tablet computer, personal digital assistant (PDA), desktop computer with a wireless network adapter, or any other device offering the ability to connect wirelessly 107 can be connected to the cable modem via a wireless connection. The PCs 106 and wireless devices 107 can use their connections to communicate with the cable modem by entering, for example, an internet protocol (IP) address, hostname, or other address that uniquely identifies the cable modem on an internal network. A VOIP handset 108 can furthermore be connected to the cable modem 102 through the MTA 104. The cable modem 102 communicates via an external network, such as the internet, to provide services to the devices connected via the internal network. For example, the cable modem 102 connects with a VOIP server 110 in order to provide VOIP services to the handset 108. The actual hardware and protocols employed by the above-described devices can vary widely, and this description is not intended to be limiting.

By accessing the cable modem 102 via a wired or wireless Ethernet connection using a web browser on a PC 106 or wireless device 107, a user is able to adjust their configuration settings for a wide range of cable modem or simply monitor the status of the cable modem. Examples of these features include router settings such as firewalls, forwarding tables, demilitarized zone IPs, in addition to wireless settings such as security settings, security type, wireless channel, etc. For example, in managing an internal network provided by the cable modem 102, a user might desire a configuration which provides a high degree of security, only allowing authorized users to connect to the network. In doing so, the user can set passwords to protect the network and the cable modem's settings. This poses an immediate hazard in that passwords are frequently forgotten.

Additionally, less technically sophisticated users can desire to change basic settings on the cable modem 102, such as turning wireless on or off. To access these settings, a user needs to open a web browser and enter an IP address, which can be confusing for many users. The present principles provide a solution, both to allowing secure and reliable access to the cable modem in the event of a lost password as well as to the need for an intuitive means for configuring the cable modem without reliance on technical knowledge.

Figure 2:
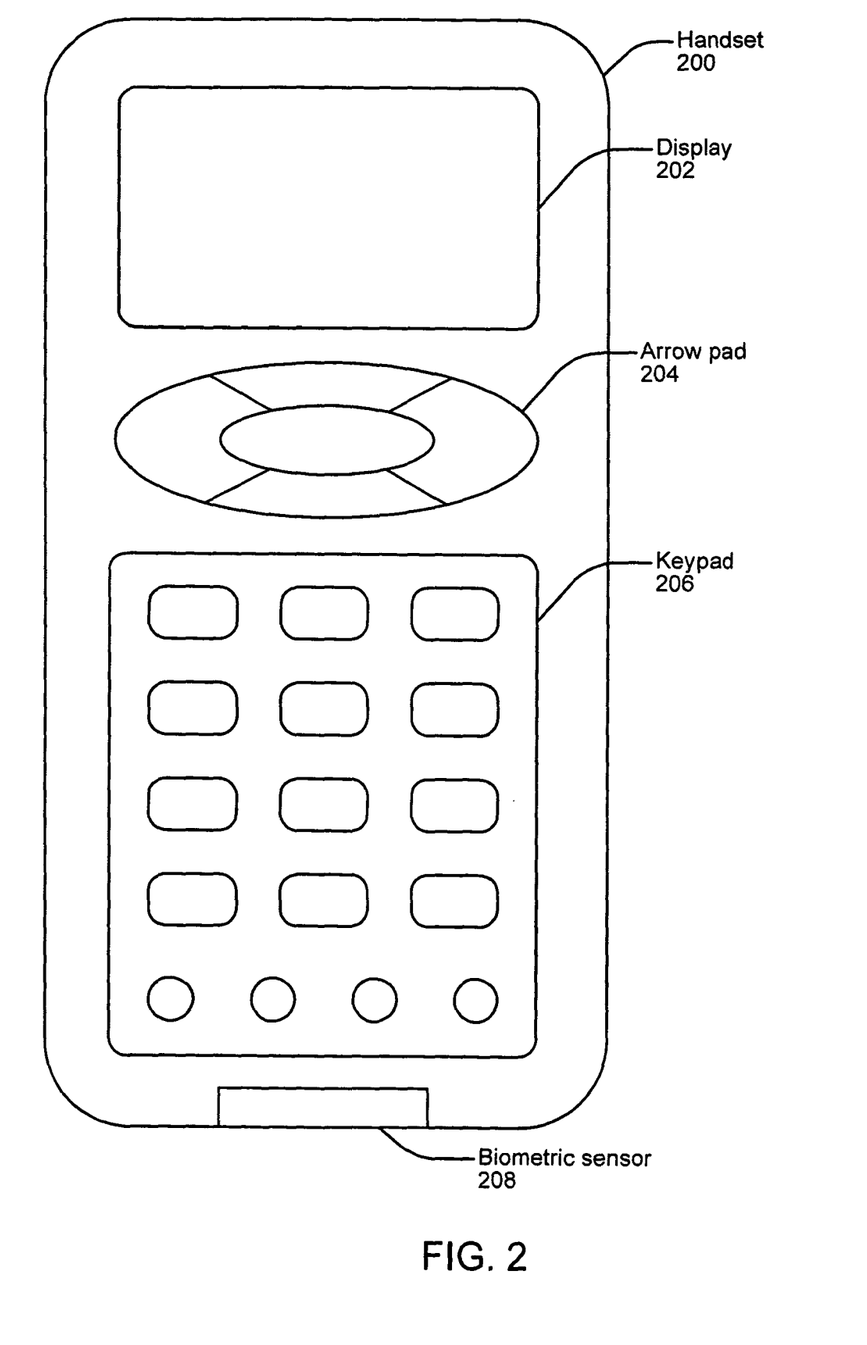
FIG. 2 is an illustration of a voice over internet protocol handset according to the present principles.

Adapting a VOIP handset 108 for the purpose of configuring the cable modem 102 represents an advantageous and much more intuitive approach to changing home network settings than has been previously available. Referring now to FIG. 2, an exemplary VOIP handset is shown according to the present principles. The handset 200 includes a display 202 which can be any visual display ranging from a full-color LCD screen to a simple alphanumeric display. The sophistication of the display 202 affects several other features, as will be described below. The handset 200 further includes, for example, input options such as an arrow pad 204 having directional buttons and a selection button to allow a user to navigate through a user interface (UI) on display 202. The handset can also further include a keypad 206 which allows the user to enter numbers and even letters using a multi-tap or "T9" predictive text scheme, similar to the techniques used for text messaging. Alternatively or in addition, the handset can feature a touch screen interface, allowing a user to directly interact with the display 202.

The handset can additionally include a biometric sensor 208 configured to acquire biometric information such as fingerprints, voice prints, retinal scans, DNA, or other identifying biological information. This information allows the handset 202 to authenticate with a device without the user's knowledge of, e.g., a username or password.

It would therefore be convenient to use such a VOIP handset to edit cable modem configuration settings. The presentation to the user of these configuration settings can depend upon the sophistication of the user interface provided by the handset. If the handset provides a web browser type interface with an HTML parser, it is possible to simply connect the user to the same web pages used for the Ethernet connection method. However, it is not likely that the handset will be as large as a PC monitor, nor is it likely to have sufficient resolution to display the standard configuration web pages in a usable manner. In that case, new pages can be generated that still allow the user to access the configuration data using the handset, but in a manner suited to the capabilities of the handset display. The display can be very simple, with no HTML support or limited resolution, and require the MTA to provide the graphics and/or text, while still allowing the user to adjust the cable modem's configuration settings. The handset can be configured to communicate its capabilities to the cable modem, such that the cable modem can intelligently provide user interface data that gracefully degrades according to the abilities and deficiencies of a given handset. For example, a cable modem with a low-end handset would only send the most basic of interface options to the handset.

The handset receives and transmits sounds to the cable modem 102 via the MTA 104. The handset 102 can transmit the voice signals as analog, or it can encode the signals as digital signals and bypass the MTA 104. The cable modem 102 then sends the audio signals to a VOIP server 110. However, the present principles allow for the transmission of additional information between the handset 108 and the cable modem 102. If the handset transmits digital audio information to the cable modem 102, the handset can also transmit additional digital control information to the cable modem 102. If the handset operates by sending audio as analog electrical signals, a control signal can be transmitted in analog or digital on a carrier wave having a frequency that is outside the range of human hearing. This allows the handset to remain in communication with the MTA 104 and the cable modem 102 without interfering with the quality of service.

The control signal allows the user to communicate with the cable modem itself by using the handset as an input and display device. The control signal communicates commands, such as a user navigating through the user interface, and carries responses from the cable modem 102. As noted above, handsets have a wide variety of possible display options, so it is advantageous for a handset to identify its capabilities through the control signal. This allows the cable modem to enhance or diminish the amount of information it supplies based on the amount of information that will be practically useful.

The control signal can be modulated on a carrier frequency according to the volume of control information being sent and sent to the handset on the same line that voice information is transmitted on. For example, a simple set of nested text menus might involve no more than on-off-keying, whereas sending a full graphical display will use significantly more bandwidth and can call for more complicated forms of digital modulation, such as quadrature amplitude modulation. Additional processing power can also be useful for more complex interface features. As a result, many embodiments are possible according to the desired range of abilities and price point for a given handset. Alternatively, the control signal can be communicated using a separate line, which increases the complexity of the design and can use more specialized equipment, but which simplifies the modulation process as it means that audible frequencies would not need to be avoided.

In an alternative embodiment, no special features are necessary for the handset 108 at all. In the event that a user has a legacy handset which does not include the ability to communicate with the cable modem via the above-described control signal or the display or input features described above, the present principles nonetheless provide a way to configure the cable modem 102 using the handset 108. The present principles provide that the user can enter a pre-programmed number on a standard touch-tone phone 108 that will alert the MTA 104 to enter into a voice or tone activated menu. For example, the cable modem can be configured to respond to the number *33, at which time the cable modem 102 would communicate to the handset 108 through the MTA 104.

This voice menu, pre-recorded and shipped as a part of the cable modem's operating software, walks the user through various configuration options and allows the user to change basic settings directly through the use of the touch-tone handset. For example, the user is able to turn features on and off and restore factory default settings in case of accidental misconfiguration or forgotten password. This provides the advantage of having direct configuration access without having to buy a new handset that specifically caters to such configuration. The user can enter configuration information by pressing a button or can speak a selection which is processed by voice recognition in the cable modem.

The present principles overcome the problems that can occur when using only a computer with an Ethernet connection. One such problem would be if the user wishes to connect a laptop to the wireless interface of the cable modem. If the wireless capabilities of the cable modem are not enabled, or are enabled but have unknown security parameters set, then the user will not be able to connect the laptop to the cable modem. The user would need to connect a computer to the cable modem using an Ethernet cable to change the cable modem wireless configuration settings, thus involving additional equipment and setup. This can be additionally inconvenient for example if the physical Ethernet jack is difficult to access or the user does not remember the steps needed to connect to the cable modem. In such cases, having a dedicated configuration tool such as an already-connected VOIP handset is by far the superior option.

An additional benefit of the present principles is that they represent a fundamentally secure method of interacting with the cable modem. Because the handset features a dedicated connection to the cable modem, there is no need to add additional and potentially confusing layers of security. This allows the user to change settings on the cable modem without needing any password, such that an attacker would need physical access to the handset or the cable modem itself to subvert the connection.

Note that one need not have a VOIP handset to provide access to the cable modem configuration settings. The same access can be made available on the cable modem itself as long as a user interface of some sort is provided. Another possibility is that, instead of a VOIP handset, the cable modem will connect to any device with a display, such as a smart tablet or similar product.

For example, according to the present principles, one can install an application on such a tablet or PDA device that will automatically connect and log in to the cable modem, providing the user with the instant ability to change the cable modem's settings. Because connecting via an Ethernet connection using such a device is potentially less secure, the application can therefore include various security features including passwords and biometrics. The application can be configured to handle all aspects of connection and authentication without any advanced user knowledge, thereby greatly streamlining the configuration process without imposing additional burdens on the user. In particular, the application can be pre-programmed with connection information such as the cable modem's IP address and the user's username and password.

Figure 3:
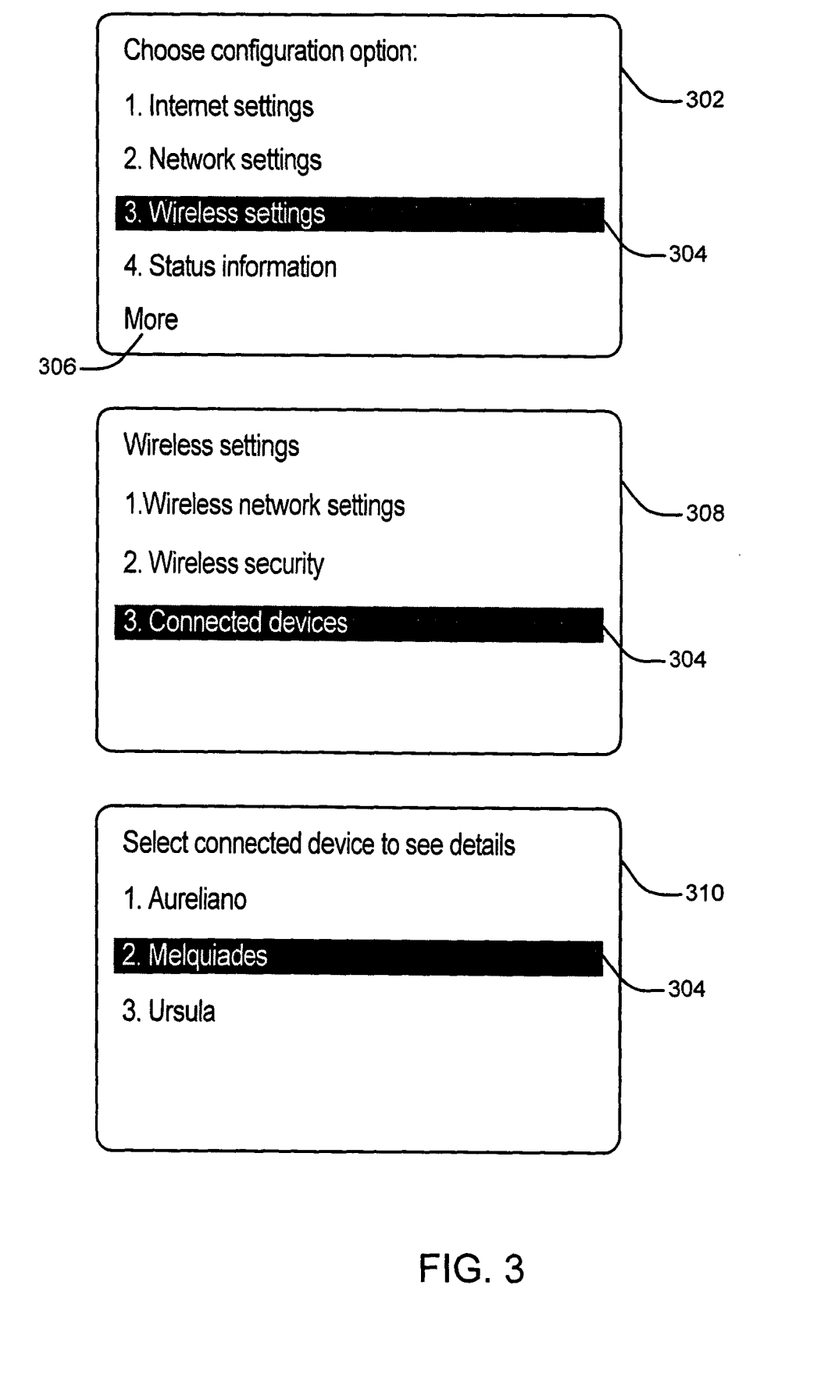
FIG. 3 is an illustration of an exemplary user interface according to the present principles.

Referring now to FIG. 3, an illustrative text-based interface using nested menus is shown. This exemplary interface depicts just one option for a display and is not intended to be limiting in any way. This interface allows a user to move an active field 304 up and down on display 302 and select a desired option. This interface is adapted to the features of the handset shown in FIG. 2, featuring several lines of text and the ability to navigate by selecting from a set of options. If there are more options than will fit on the screen at any one time, the user can select a "More" option 306 to view more options. Selecting an option moves the interface from one screen to the next, e.g., from 302 to 308 to 310.

The interface shown in FIG. 3 can be translated into a voice menu embodiment. For example, instead of displaying the options for a user on a handset's visual display 302, the cable modem uses a recorded or synthesized spoken voice to read to the user the different options, each associated with a number. The user can then enter the number appropriate for a given selection, which will bring the voice menu to the next level of the configuration. A recorded voice menu provides the advantage of sounding natural to the user, but such a menu can have difficulty addressing options which involve user-provided information. The cable modem can therefore provide some or all menu options through the use of a voice synthesizer that generates speech as needed.

Figure 4:
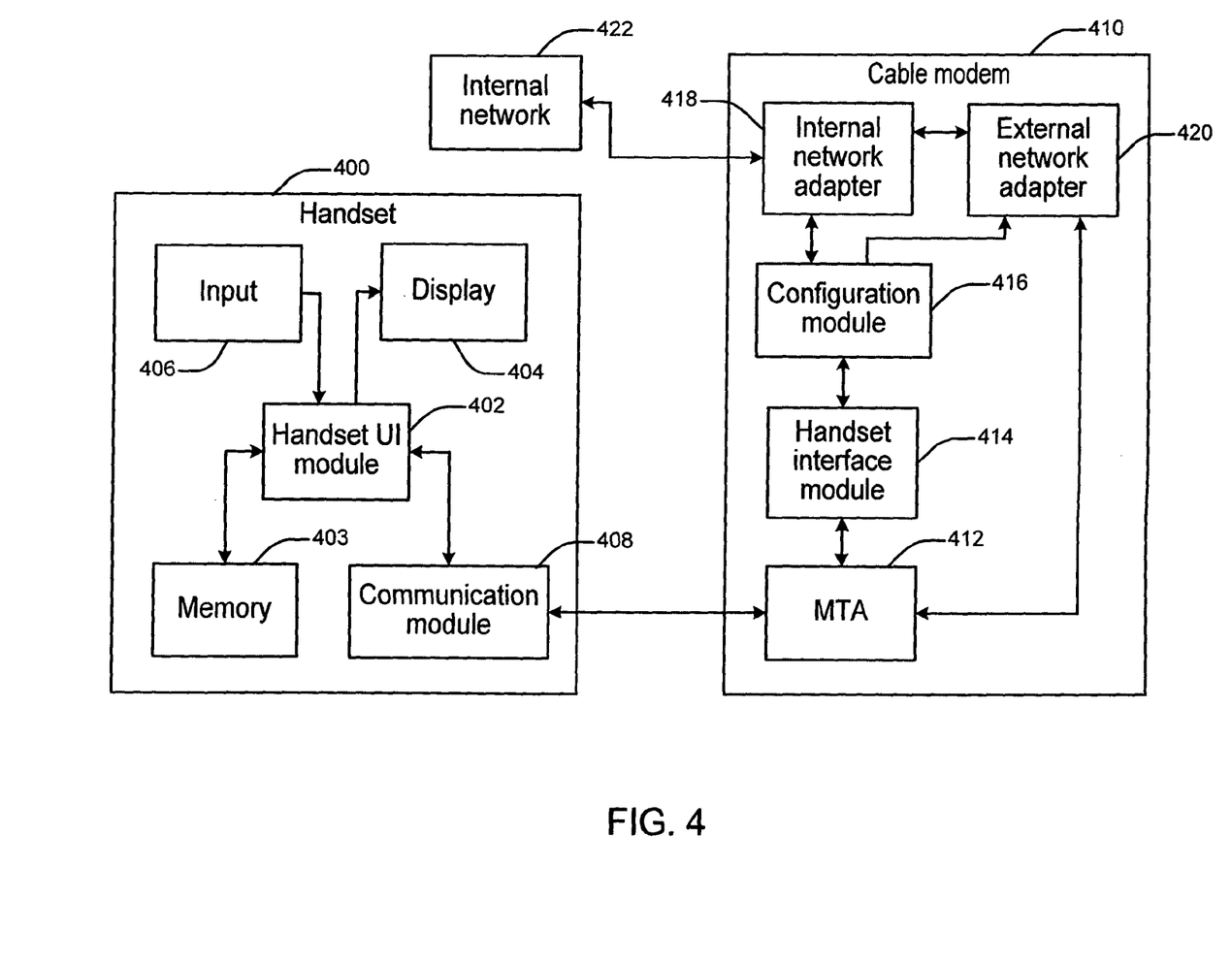
FIG. 4 is a block/flow diagram of a handset and cable modem system which provides the handset with the ability to change configuration settings on the cable modem.

An exemplary embodiment of a system according to the present principles is shown in FIG. 4. The handset 400 includes a display 404 and an input 406 in communication with a handset UI module 402. The display 404 can comprise, for example, an LCD screen with full-color capability or a simple text interface. The input 406 can comprise, for example, a directional input, a numerical pad, a full keyboard, a microphone, and/or one or more biometric sensors. The UI module is in communication with cable modem 410 through communication module 408, which transmits and receives control signals to and from the MTA 412. The UI module not only provides user input information to the cable modem 410, but also provides device information including identification information and details about the handset's capacities and abilities. The UI module in turn receives UI information from the cable modem as described above.

The MTA 412 is connected to an external network adapter 420, which allows the handset 400 to perform its primary function of interne telephony. In addition, the MTA communicates with a handset interface module 414 that receives the user's inputs and provides responses in the form of UI display changes, communicated via control signal. In the alternative embodiment using a legacy handset that cannot communicate via control signal, the handset interface module 414 provides a voice menu which the user can interact with. In this embodiment, the handset interface module includes additional memory to store the voice menu or, alternatively, a voice synthesizer module to flexibly produce such a menu responsive to the current settings of the cable modem 410 and the user's input. The handset interface module can be further configured to allow the user to enter a selection by speaking a selection, e.g. by stating, "change wireless settings." The handset interface module can therefore include voice recognition and processing capabilities to allow it to process such user input.

The handset interface module 414 parses the user's input and uses said input to direct changes to the configuration module 416. The configuration module 416 stores the settings for the cable modem 410 and uses said settings to direct the operation of both internal network adapters 418 and the external network adapter 420. The configuration module 416 can change settings at the direction of a user or of a service provider, thereby allowing for flexible adaptation of the cable modem's functions and purpose after installation. The configuration module 416 can also be accessed through the internal network adapter 418, which allows PCs and wireless devices to change settings via the internal network 422. As such, the internal network adapter 418 can comprise one or more wired or wireless Ethernet adapters or any other form of communication.

The configuration module 416 furthermore has the ability to accept updates and upgrades. For example, a firmware update can be available, whether from the service provider via the external network adapter 420 or the user via an internal network adapter 418. Such an update can change the current configuration of the cable modem 410 and furthermore can introduce or remove some configuration options entirely. As such the configuration module also supplies update information to the handset interface module 414 such that the user interface remains up to date and continues to accurately reflect the state of the cable modem 410.

In an alternative embodiment, the handset 400 can further include memory 403, which allows the handset to store user interface information. In such an embodiment, the handset can be programmed in advance with the user interface, thereby obviating the need for the cable modem 410 to transmit such information to the handset 400. This allows for significant reductions in the amount of bandwidth when the user changes configuration settings.

Figure 5:
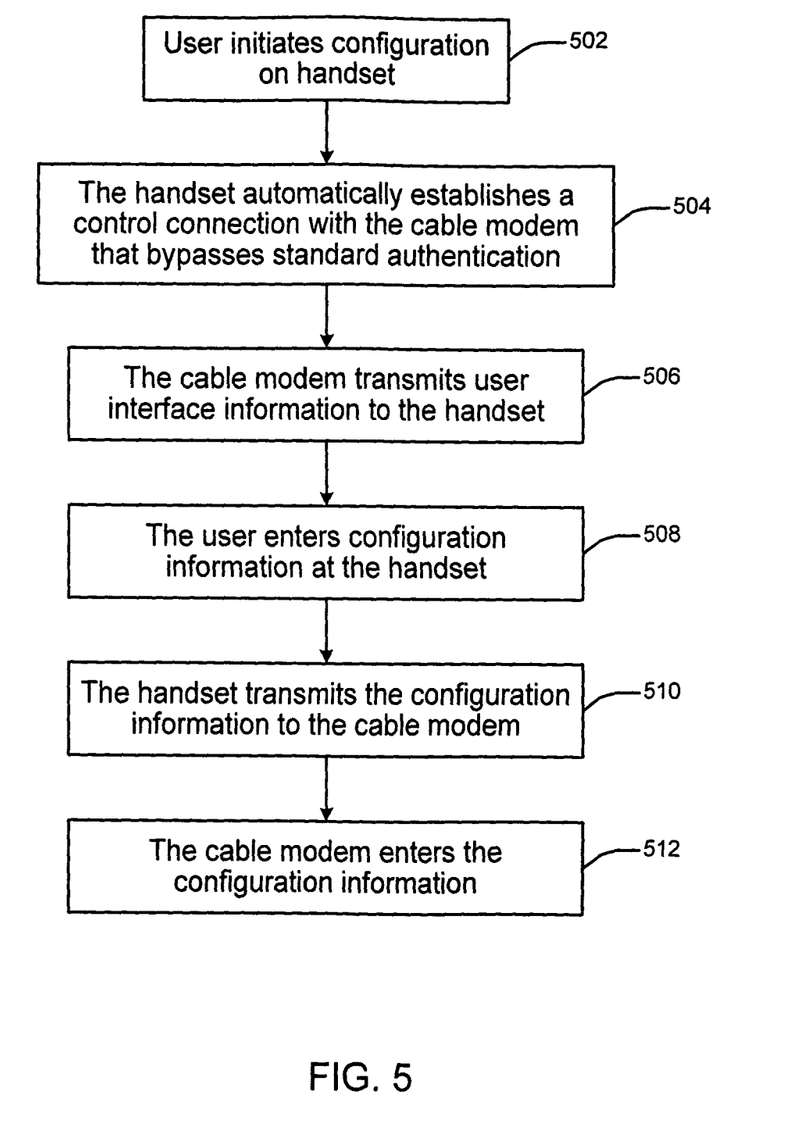
FIG. 5 is a block/flow diagram of a method for changing the configuration settings of a cable modem using a handset.

Referring now to FIG. 5, an exemplary method for configuring a cable modem is shown. A user begins configuration on the handset at block 502, for example by pressing a button, tapping an icon, giving a voice command, or dialing a number. At block 504, the handset establishes a control connection with the cable modem. This control connection bypasses the standard authentication steps that the cable modem takes for other modes of connection. For example, if the cable modem requires entry of a username and password for configuration connections that occur over a wired Ethernet connection, the handset user would not be forced to enter such a password. Establishing this connection is automatic and does not require the entry of special information such as an IP address.

In an alternative embodiment, the handset has additional authentication features. For example, the handset might allow a user to authenticate with the cable modem via biometric information such as fingerprints, voice prints, retinal scans, DNA, etc. This information can be gathered automatically or at the user's direction using a biometric sensor built into the handset. When the handset establishes the control connection 504, the handset can provide this biometric information to the cable modem, allowing for secure authentication without requiring the user to memorize authenticating information such as a username and password.

The cable modem then transmits user interface information to the handset via the control connection at block 506. At block 508, the user enters configuration information at the handset. The handset next transmits the configuration information to the cable modem via the control connection at block 510. The cable modem then makes changes to its configuration settings based on the configuration information at block 512.

Having described preferred embodiments for systems and methods for configuration access via connected devices (which are intended to be illustrative and not limiting), it is noted that modifications and variations can be made by persons skilled in the art in light of the above teachings. It is therefore to be understood that changes can be made in the particular embodiments of the invention disclosed which are within the scope of the invention as outlined by the appended claims. While the forgoing is directed to various embodiments, other and further embodiments of the invention can be devised without departing from the basic scope thereof.

The invention claimed is:

1. A method for configuring a cable modem, comprising:
   initiating a configuration connection between a user service device and a cable modem over a dedicated service port that bypasses authentication by the cable modem; and
   changing settings on the cable modem in accordance with input from the user service device.

2. The method of claim 1, further comprising transmitting user interface information from the cable modem to the user service device.

3. The method of claim 2, wherein the user service device is voice activated.

4. The method of claim 2, wherein said user interface information comprises only information that can be displayed on the user service device.

5. The method of claim 1, wherein the configuration information is transmitted over a connection that is dedicated to the user service device.

6. A communication device, comprising:
   a configuration module configured to control operation of at least one network port and having an authentication function; and
   an interface module connected to a dedicated service port configured to provide services to a user service device, and further connected to the configuration module, said interface module being configured to modify operation of the configuration module in response to user input, and being further configured to provide user interface information to the dedicated service port, wherein the interface module bypasses the configuration module's authentication function for user inputs that come from the dedicated service port.

7. The communication device of claim 6, wherein the dedicated service port comprises a multimedia terminal adapter (MTA).

8. The communication device of claim 6, wherein the dedicated service port is configured to transmit user interface information to the user service device and receive control information from the user service device.

9. The communication device of claim 8, wherein the dedicated service port is configured to transmit and receive said information by modulating the information onto an audio signal.

10. The communication device of claim 8, wherein the interface module is configured to provide user interface information responsive to said control information.

11. The communication device of claim 8, wherein the user interface information comprises a voice menu.

12. The communication device of claim 8, wherein the dedicated service port is configured to communicate with the handset along a dedicated control line.

13. The communication device of claim 8, wherein the interface module is configured to provide auxiliary authentication information including biometric information.

14. The communication device of claim 10, wherein said control information identifies display capabilities of the user service device and said user interface information includes only information within the display capabilities of the user service device.

15. A communication system, comprising:
  a communication device, configured to be reconfigurable by a user, having a dedicated service port and an authentication function; and
  a dedicated user service device connected to the dedicated service port, configured to bypass the authentication function and change settings for the communication device.

16. The communication system of claim 15, wherein the communication device further comprises an interface module operatively connected to the dedicated service port configured to provide services to the dedicated user service device, and further connected to a configuration module, said interface module being configured to modify the operation of the configuration module in response to user input, and being further configured to provide user interface information to the dedicated service port.

17. The communication system of claim 15, wherein the dedicated service port comprises a multimedia terminal adapter (MTA) configured to provide voice over internet protocol services.

18. The communication system of claim 15, wherein the communication device is further configured to provide user interface information to the dedicated user service device that is tailored to the capabilities of the dedicated user service device.

19. The communication system of claim 15, wherein the communication device further comprises at least one network port configured to connect to network devices, and wherein the settings control the behavior of the at least one network port.

* * * * *